United States Patent [19]

Murtaugh

[11] Patent Number: 4,642,866

[45] Date of Patent: Feb. 17, 1987

[54] HUB REMOVING DEVICE AND METHOD

[76] Inventor: Bernard H. Murtaugh, 512 Woodland Dr., Havertown, Pa. 19083

[21] Appl. No.: 737,107

[22] Filed: May 23, 1985

[51] Int. Cl.[4] .............................................. B23P 19/04

[52] U.S. Cl. ....................................... 29/259; 29/266; 29/426.5

[58] Field of Search ................. 29/256, 258, 259, 263, 29/264, 266, 426.5

[56] References Cited

U.S. PATENT DOCUMENTS

| | | | |
|---|---|---|---|
| 1,465,124 | 8/1923 | Gardner, Jr. | 29/263 |
| 1,522,983 | 1/1925 | Strassner . | |
| 2,424,681 | 7/1947 | Eberhart | 29/263 |
| 2,430,201 | 11/1947 | Wyscaver | 29/256 X |
| 2,551,900 | 5/1951 | Pihl | 29/259 |
| 2,684,527 | 7/1954 | Hedlund . | |
| 2,820,285 | 1/1958 | Neumeister, Jr. | 29/266 X |
| 2,860,507 | 11/1958 | Grunder et al. . | |
| 3,008,226 | 11/1961 | Kellerman | 29/263 |
| 4,057,889 | 11/1977 | Ferguson | 29/266 X |
| 4,065,844 | 1/1978 | Lieser et al. | 29/263 X |
| 4,551,898 | 11/1985 | Provost | 29/263 X |

OTHER PUBLICATIONS

Motor/Age, Jul., 1985, p. 28.

*Primary Examiner*—Frederick R. Schmidt
*Assistant Examiner*—Steven P. Schad
*Attorney, Agent, or Firm*—Connolly and Hutz

[57] ABSTRACT

A hub removing device includes a plurality of abutting members extending outwardly from a support plate through openings in a lifting plate. A jack screw is mounted to the support plate and is threadably engaged with the lifting plate so that manipulation of the jack screw causes the lifting plate to move toward the support plate. The lifting plate in turn is coupled to the hub and the abutting members press against a fixed surface so that the movement of the lifting plate toward the support plate causes the hub to be urged outwardly.

6 Claims, 5 Drawing Figures

HUB REMOVING DEVICE AND METHOD

BACKGROUND OF THE INVENTION

The present invention is concerned with a device for removing hubs from vehicles. More particularly, the present invention is concerned with vehicles such as manufactured by Honda Motor Company wherein the hub is mounted to the disc brake with the central axial opening of the hub being readily accessible. The conventional method presently used involves a slide hammer which is inserted through a central opening in the hub and which must be manipulated to remove the hub. In general hub removal devices utilize a forward pulling action which is not only inconvenient but also requires extensive manual effort for the hub removal.

SUMMARY OF THE INVENTION

An object of this invention is to provide a device for removing a hub from vehicles.

A further object of this invention is to provide such a device which may be manipulated in a convenient manner without requiring undue manual effort by the user.

A still further object of this invention is to provide such a device which may also be used for removing bearings associated with the hub.

In accordance with this invention, the hub removing device includes a support plate having a plurality of abutting members which extend through openings in a lifting plate for pressing against a fixed surface such as the brake disc. The lifting plate is coupled to the hub and includes means for engaging an actuating member mounted to the support plate so that when the actuating member is manipulated, the lifting plate is drawn toward the support plate through the aid of the abutting members pressing against the fixed surface in back of the hub. This results in the hub also being urged toward the support plate for removal of the hub. The actuating member mounted to the support plate may be a jack screw with the abutting members functioning as a jack stand.

After the hub has been withdrawn, the same device may be used for removing the bearings. This would be accomplished by detaching the lifting plate and attaching a contact plate to the actuating member on the remote side of the bearings. Manipulation of the actuating member would draw the contact plate forward and thereby push the bearings out of their seat.

THE DRAWINGS

DETAILED DESCRIPTION

The present invention is directed to a hub removal device. In particular, the invention is directed to the removal of hubs from vehicles which have the axial center of the hub open to permit the mounting and manipulation of the device for hub removal. Such vehicles are presently manufactured by Honda Motor Company.

Figure 4:
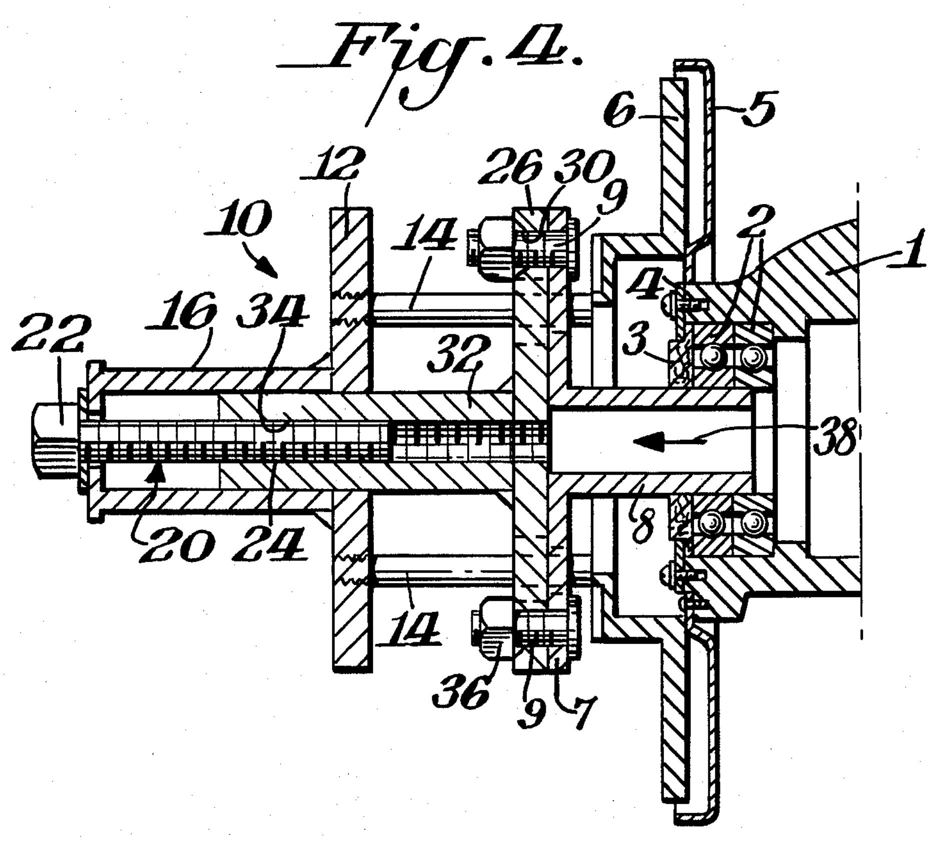
FIG. 4 is a cross-sectional view in elevation of the device of FIGS. 1–3 during the hub removal operation.

FIG. 4 illustrates in cross section the details involving the brake assembly with which the present invention would be used. As shown therein, the vehicle would include a steering knuckle 1 having a recessed annular face with a shoulder which provides a seat for the bearings assembly 2. A dust seal 3 is located at the front face of the bearings 3 and mounted to the knuckle 1 by means of a dust seal clamp 4. The vehicle also includes a splash guard 5. The brake disc is illustrated in FIG. 4 by the reference numeral 6. The hub is designated by the reference numeral 7 and includes the extension 8 in contact with the bearings 2. Hub 7 would also include a set of spaced wheel mount studs 9. With Honda vehicles, four equally spaced wheel mount studs are provided. The wheel itself would be attached to the hub through the use of lug nuts threaded on the wheel mount studs. Although not illustrated, a set of four bolts secure hub 7 to brake disc 6.

FIGS. 1–4 illustrate the hub removing device 10 in accordance with this invention. As shown therein, device 10 includes a support plate 12 having a plurality of abutting members 14 extending outwardly in a perpendicular direction from support plate 12. In the illustrated embodiment, four such abutting members 14 are provided, as later described. Support plate 12 also includes an upstanding hollow cylindrical boss 16 having an end plate 18 at the outer end thereof. An elongated actuating member 20 extends through boss 16 and beyond support plate 12, generally parallel to abutting members 14.

In the preferred form of this invention, actuating member 20 is formed as a jack screw having a nut or other noncircular outer surface 22 at its outer end with the remaining cylindrical portion 24 of actuating member 20 being threaded. As a result, actuating member 20 may be conveniently manipulated by an applicating member such as a wrench rotating nut 22.

Abutment members 14 may be secured to support plate 12 in any suitable manner and function as a jack stand.

Figure 2:
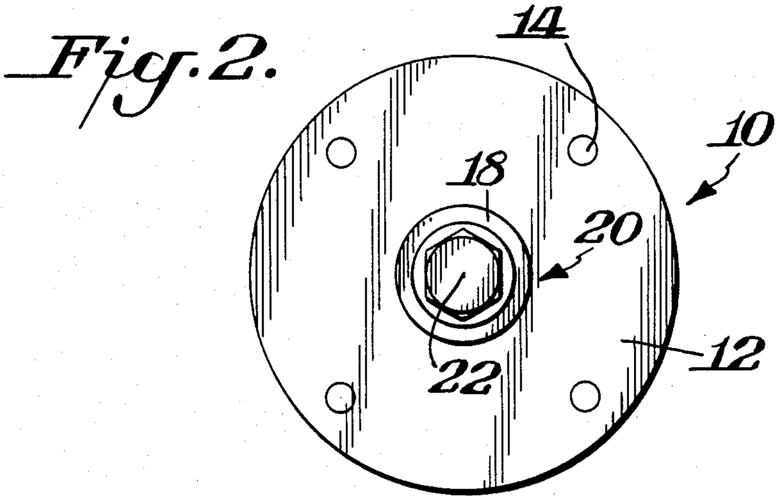
FIGS. 2 and 3 are top and bottom plan views of the hub removing device of FIG. 1.
Figure 1:
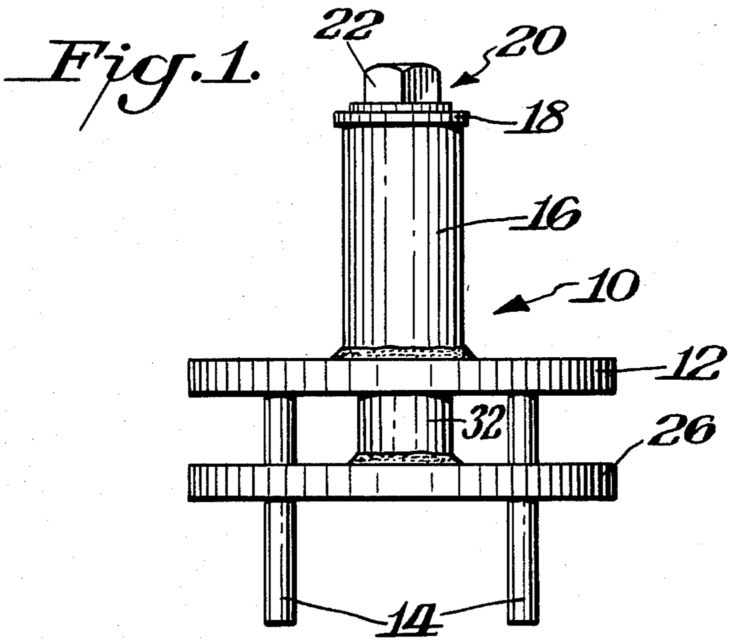
FIG. 1 is a front elevation view of a hub removing device in accordance with this invention.
Figure 3:
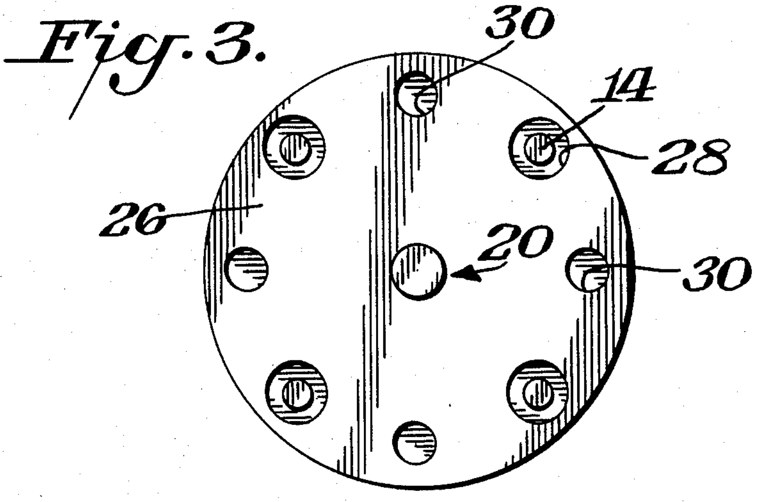

Hub removing device 10 also includes a lifting plate 26. As best shown in FIG. 3, lifting plate 26 is provided with two sets of co-arcuate holes or openings. One set of openings 28 is dimensioned and positioned so that abutting members 14 may pass therethrough. A second set of arcuate openings 30 is disposed between openings 28. Openings 30 are positioned and dimensioned to permit wheel mount studs 9 to pass therethrough, as later described.

Lifting plate 26 also includes an upstanding cylindrical boss 32 which is internally threaded as indicated by the reference numeral 34 (FIG. 4) for threaded engagement with the externally threaded cylindrical surface 24. Boss 32 is located and dimensioned to be telescopically received in boss 16 of support plate 12.

FIG. 4 illustrates the practice of this invention for removing hub 7. In operation, the bolts fastening hub 7 to brake disc 6 would be removed thus leaving a set of openings in the hub 7. Lifting plate 26 would be secured parallel to and spaced from support plate 12 by engagement of threaded actuating member 20 of support plate 12 with boss 32 of lifting plate 26. Device 10 would then be mounted to hub 7 by passing abutting members 14 through the exposed holes of hub 7 which were left when the bolts were removed therefrom as previously described. Abutting members 14 would then make contact with brake disc 6 which would function as a fixed surface. In the course of passing abutting members 14 through the holes in hub 7, wheel mount studs 9 would pass through the set of openings 30 in lifting plate 26. Hub 7 would then be secured to lifting plate 26 by applying suitable nuts 36 to wheel mount studs 9.

After device 10 is mounted in place with hub 7 bolted to lifting plate 26, the hub 7 may then be removed. This is easily accomplished by rotating actuating member 20 through the use of a wrench or other suitable tool. The rotating action would draw boss 32 upwardly into boss 16 which, in turn, would move lifting plate 26 toward support plate 12. During this action, hub 7, which is coupled to lifting plate 26, is also moved in a direction indicated by the arrow 38 of FIG. 4. The removal process is facilitated by abutting members 14 pressing against the fixed surface provided by brake disc 6. Manipulation of actuating member 20 continues until hub 7 has been completely removed at which time device 10 can be withdrawn away from brake disc 6.

Device 10 is particularly advantageous in that utilization is made of the components already provided on the vehicle for removal of the hub. In this regard, the wheel mount studs or bolts 9 which are already mounted to hub 7 are utilized for locking hub 7 to lifting plate 26. In addition, the holes in hub 7 left by the removal of the intermediate bolts from hub 7 provide a passageway through which the legs or abutting members 14 may be inserted for making contact with brake disc 6. A further advantage of device 10 is in its manner of operation which utilizes a pressing movement against a fixed surface by means of abutting members 14 reacting against brake disc 6 so that in effect the hub is pushed outwardly from its seating during the removal rather than the conventional manner which involves a pulling from the front face as with a slide hammer. Moreover, the manual effort required for removal of the hub is significantly reduced.

Figure 5:
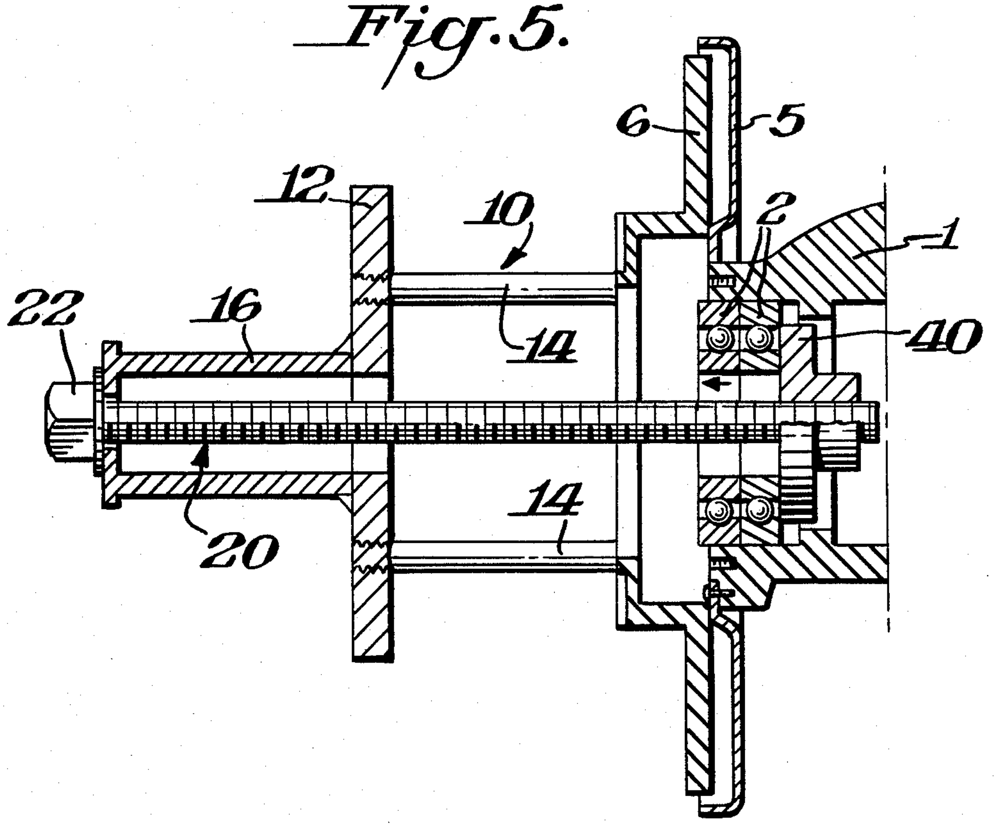
FIG. 5 is a cross-sectional view similar to FIG. 4 showing the device in its bearings removal operation.

Device 10 is useful not only in removing a hub but also with minor adaptations device 10 may be used for removing the bearings. Reference in this regard is made to FIG. 5. FIG. 5 illustrates the condition of the vehicle after hub 7 has been removed. By removing the hub it is then possible to readily detach dust seal clamp 4 and dust seal 3 thereby leaving the front face of bearings assembly 2 exposed. For removal of the bearings, device 10 would be utilized by first detaching lifting plate 26 and its boss 32. This could be done by simply reversing the direction of rotation of threaded actuating member 20 until its threaded outer surface 24 is no longer engaged with the threaded inner surface of boss 32. Device 10, or more particularly support plate 12 with its boss 16 and actuating member 20, would then be moved into the proper position illustrated in FIG. 5. As shown therein, abutting members or legs 14 again make contact with brake disc 6. In addition, the remote end of actuating member 20 extends through the axial opening of bearings 2 and terminates outwardly beyond bearings 2. A contact plate 40 which is internally threaded is then threadably engaged with actuating member 20. Contact plate 40 is placed into contact with the remote face of bearings 2. By manipulating actuating member 20, contact plate 40 is drawn toward support plate 12 because of the threaded engagement of contact plate 40 on actuating plate 20. This results in pushing bearings 2 outwardly away from their seat in steering knuckle 1 until bearings 2 have been removed. Again, as with the hub removal, the removal of the bearings is facilitated by abutting members 14 reacting against the fixed surface provided by brake disc 6.

It is to be understood that variations of this invention are possible within the broad concepts set forth herein. For example, a set of four abutting members is illustrated since that number of abutting members would take advantage of the holes left in the hub of a Honda vehicle. A lesser number of abutting members may also be used with a Honda vehicle or a different number of abutting members may be used where appropriate for a different type of vehicle. Although lifting plate 26 is illustrated as having an upstanding internally threaded boss, the invention may be practiced by omitting the boss and providing a threaded axial opening in lifting plate 26. In addition, the relative proportions and shapes of the various components of device 10 may also be changed without departing from the invention.

As can be appreciated, the invention provides a versatile device which may be conveniently used with little effort for removing a hub and then with minor modification for removing the associated bearings. The concepts herein, however, are not intended to be limited to any particular components which are being removed.

What is claimed is:

1. A hub removing device comprising a support plate, a plurality of abutting members secured to and extending outwardly from said support plate, a lifting plate disposed parallel to said support plate, securing means on said lifting plate for securement to the hub, said abutting members extending beyond said lifting plate for abutting against a fixed surface, a receiving member secured to said lifting plate, an actuating member mounted at a fixed distance with respect to said support plate and extending beyond said support plate in the same direction as said abutting members, said actuating member being engaged with said receiving member whereby manipulation of said actuating member causes said receiving member to draw said lifting plate toward said support plate to thereby lift the hub toward said support plate, a hollow boss being mounted to said support plate parallel to but extending in the opposite direction as said abutting members, said boss having an end wall remote from said support plate, said actuating member being mounted to said end wall, said actuating member extending from said end wall through said boss and to said receiving member, two sets of co-arcuate holes extending through said lifting plate, said abutting members extending through one of said sets of holes, the other of said sets of holes comprising said securing means an internally threaded boss being mounted to said lifting plate and telescoped into said hollow boss and through said support plate and generally in contact with said support plate and said actuating member being threadably engaged with said internally threaded boss whereby said internally threaded boss comprises said receiving means.

2. The device of claim 1 wherein each of said sets of holes comprises four equally spaced holes, and said plurality of abutting members comprising four equally spaced legs.

3. The device of claim 2 wherein an end of said activating member extends beyond said end wall of said hollow boss and has a non-circular outer surface for accommodating a manipulating tool.

4. The device of claim 1 wherein said holes of said two sets of co-arcuate holes are located along the same circular arc.

5. A method of removing a hub from a brake disc comprising mounting a lifting plate to a support plate by passing a plurality of abutting legs secured to the support plate through holes in the lifting plate, threadably engaging an actuating member on the support plate with an internally threaded portion of the lifting plate, removing the bolts which fasten the hub to the brake disc to leave a plurality of exposed holes in the hub, passing the abutting members through the exposed holes of the hub until the abutting members contact the brake disc, simultaneously passing the wheel mount studs attached to the hub through holes in the lifting plate, attaching fasteners to the wheel mount studs to lock the lifting plate and hub together, and manipulating the actuating member to draw the lifting plate toward the support plate and correspondingly urge the coupled hub outwardly while the abutting members react against the brake discs.

6. The method of claim 5 including detaching the hub and lifting plate from the support plate, removing the dust seal and clamp from the front of the bearings to expose one face of the bearings, inserting the actuating member through the axial opening of the bearings until the actuating member is beyond the bearings, attaching a contact plate to the actuating member by threadably engaging the actuating member with an internally threaded bore in the contact plate, and manipulating the actuating member to draw the contact plate toward the support plate for urging the bearings forwardly out of their seat.

* * * * *